Figure 1:
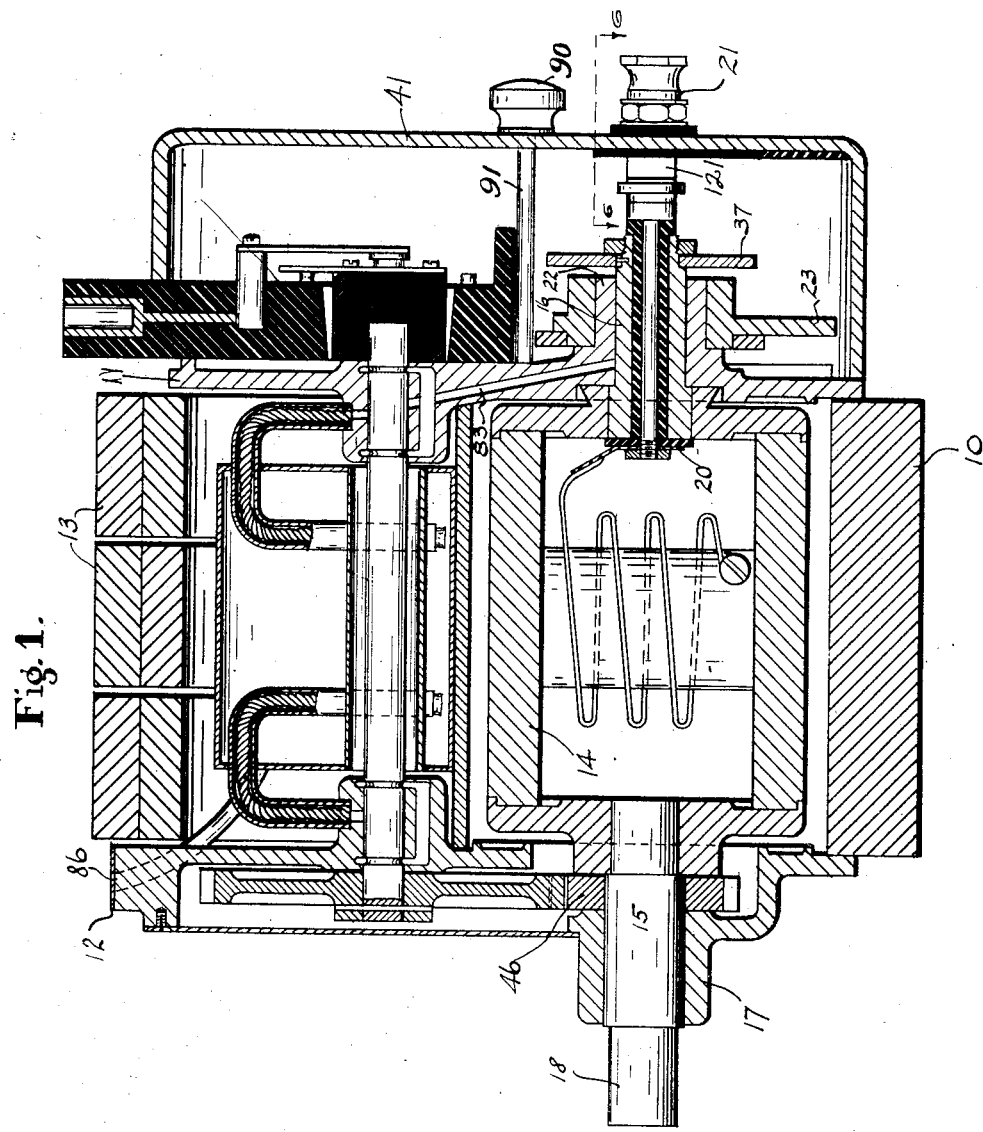

L. J. & L. E. SEVISON.
MAGNETO.
APPLICATION FILED JULY 13, 1911.

1,088,736.

Patented Mar. 3, 1914.

2 SHEETS—SHEET 1.

WITNESSES:
J. H. Swan
O. M. McLaughlin

INVENTORS,
Luther James Sevison +
Luther Earl Sevison.
BY
V. H. Lockwood
ATTORNEY.

L. J. & L. E. SEVISON.
MAGNETO.
APPLICATION FILED JULY 13, 1911.
1,088,736.
Patented Mar. 3, 1914.
2 SHEETS—SHEET 2.
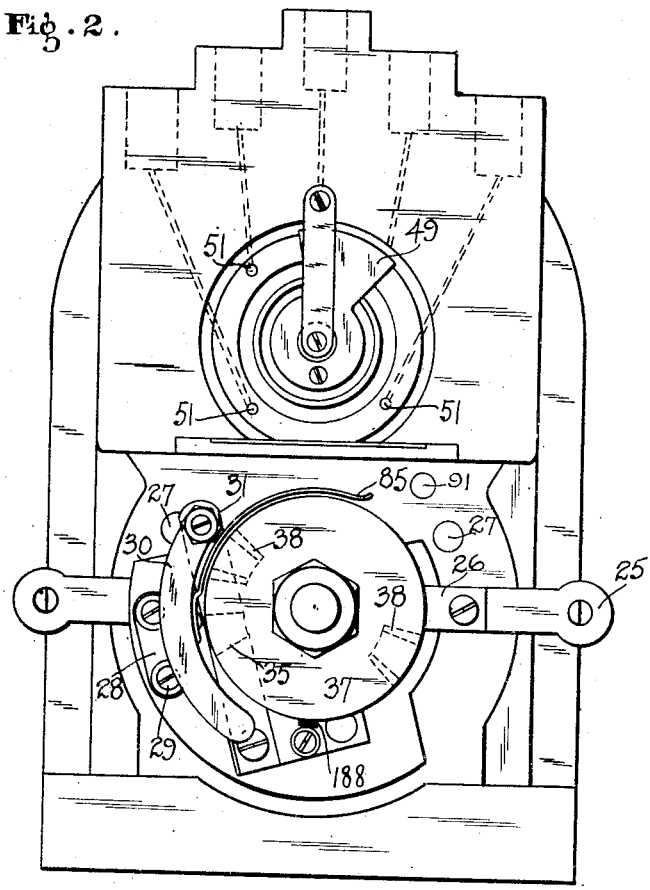
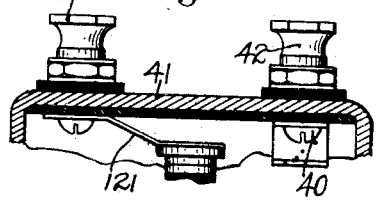
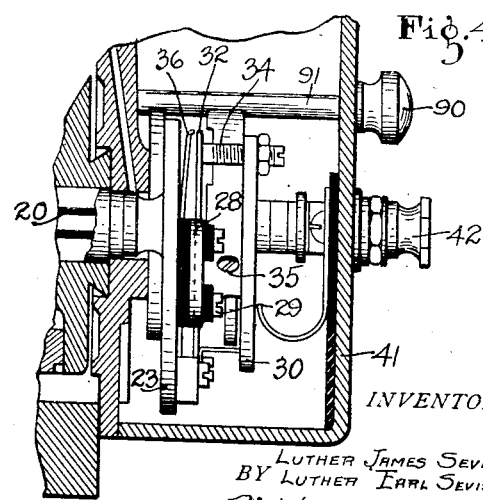
WITNESSES:
A. H. Edgerton.
O. M. McLaughlin.
INVENTORS,
LUTHER JAMES SEVISON &
BY LUTHER EARL SEVISON.
W. H. Lockwood
ATTORNEY.

UNITED STATES PATENT OFFICE.

LUTHER JAMES SEVISON AND LUTHER EARL SEVISON, OF ELKHART, INDIANA.

MAGNETO.

1,088,736.   Specification of Letters Patent.   Patented Mar. 3, 1914.

Application filed July 13, 1911. Serial No. 638,286.

*To all whom it may concern:*

Be it known that we, LUTHER JAMES SEVISON and LUTHER EARL SEVISON, citizens of the United States, and residents of Elkhart, county of Elkhart, and State of Indiana, have invented a certain useful Magneto; and we do hereby declare that the following is a full, clear, and exact description thereof, reference being had to the accompanying drawings.

The object of this invention is to provide an improved magneto generator which may be used to furnish current for the ignition of internal combustion engines.

The features of the invention lie in providing a spring contact point which will always make contact at very high speeds together with an adjustable yoke, whereby the sparks may be advanced or retarded and the circuit breaker kept in perfect time with the armature and a disk cam circuit breaking device.

A further feature is an oiling device, whereby the parts of the magneto are kept perfectly oiled.

The nature of the invention will be understood from the accompanying drawings and the following description and claims:

In the drawings Figure 1 is a vertical longitudinal section midway of the device. Fig. 2 is an elevation of the collecting end with the cover removed. Fig. 3 is a left end elevation of the device shown in section in Fig. 1. Fig. 4 is a side elevation of the collecting device shown in section in the lower right-hand portion of Fig. 1.

In detail there is shown in the drawings a magneto having a base 10, end plates 11 and 12 secured thereto, permanent field magnets 13 and an armature 14 mounted on a shaft 15 which has bearings 16 and 17 in end plates 11 and 12, respectively. Said armature shaft 15 projects through the bearings 11 and 12 and one end 18 is adapted to be driven from any convenient source of power and the other end is provided with a collecting device, whereby the current generated in the armature may be collected and delivered for use as it is desired. The armature 14 is of the common shuttle-wound type with one terminal of the winding connected through the shaft 15 and insulated therefrom by the insulation 20 to a binding post 21 on the cover of the machine through a flexible connection 121. The other terminal of said armature winding is grounded on the frame of the armature. The bearing 16 for the collector end of the armature has an outward hub-like projection 22 which furnishes bearing for an oscillatable circuit breaker 23. This circuit breaker may be oscillated about its hub by means of a yoke 25 secured to the circuit breaker by a clamp 26 with stops 27 provided in the end plate 11 to limit the movement of said yoke. Insulatably mounted on said breaker body a bracket 28 is secured by screws 29, said bracket extending at right angles to the breaker body and having on its outer end an arced portion 30 with a contact screw 31 mounted thereon. A flat spring 32 is secured at one end to the breaker body 23 and has a contact point 34 adapted to make contact with the screw 31. Lying against the breaker body and behind the spring 32, though not making contact with it, a second spring 36 is secured which may limit the backward movement or free movement of said spring 32. The arced portion 30 mounted on the breaker body has electrical connection through a brush 40, shown in Fig. 4, insulatably mounted on the casing 41 to a binding post 42 also insulatably mounted on the casing 41, see also Fig. 4. A disk 37 is rigidly secured to the armature shaft and has two diametrically opposed projections 38 extending on the side toward and adapted when the armature shaft is revolved to meet a projection 35 on the spring 32 and cause the contact point 34 on said spring to leave the contact screw 31 and thus break the circuit.

Oil passing from the armature bearing will pass to the disk cam 37 and will be thrown outward by centrifugal force and keep the wearing points well oiled on the cam and the contact spring but a shield 85 secured to the arced portion 30 of the circuit breaker, extending about the disk 37 and lying between it and the contact screw 31, prevents any oil from being thrown against the screw and keeps the contact points from being fouled. In addition to the oil shield 85, an oil wiper 188 is provided to collect the oil from the perimeter of the disk. This wiper is secured to the breaker body and extends outwardly therefrom past the disk 37.

The casing 41 is secured in place by means of the thumb nut 90 on the end of the rod 91 extending from the end plate 11.

We claim as our invention:

1. A magneto electric generator including a shaft, a circuit breaker frame mounted so as to be oscillated about said shaft for the adjustment, a flat contact spring mounted on said frame in a direction substantially at a right angle with said shaft, a contact screw mounted fixedly on said frame in position to be engaged by said spring contact under the normal action of the spring, a disk secured on the shaft having lateral projections, and a projection on the spring adapted to be engaged by the projections on said disk whereby the spring contact will be moved away from the contact screw periodically.

2. A magneto electric generator including a shaft, a circuit breaker frame mounted so as to be oscillated about said shaft for the adjustment, a flat contact spring mounted on said frame in a direction substantially at a right angle with said shaft, a contact screw mounted fixedly on said frame in position to be engaged by said spring contact under the normal action of the spring, a disk secured on the shaft having lateral projections, a projection on the spring adapted to be engaged by the projections on said disk whereby the spring contact will be moved away from the contact screw periodically, and a fender plate secured to said frame and held adjacent a portion of the periphery of said disk and between the disk and contact points, whereby the contact points will be protected from oil or the like being thrown centrifugally from said disk.

3. A magneto electric generator including a shaft, a circuit breaker frame mounted so as to be oscillated about said shaft for the adjustment, a flat contact spring mounted on said frame in a direction substantially at a right angle with said shaft, a contact screw mounted fixedly on said frame in position to be engaged by said spring contact under the normal action of the spring, a disk secured on said shaft with a lateral projection, a projection on the spring adapted to be engaged by the projection on the disk for actuating the spring, a bracket secured to said frame having a bar curved concentric with said disk near the periphery thereof, a contact screw mounted in said bar in position to be engaged by the spring contact when the spring is released, and a fender plate secured to said bracket and extending partially about the periphery of said disk and between the disk and said contact point.

4. A magneto electric generator including a shaft, a circuit breaker frame mounted so as to be oscillated about said shaft for the adjustment, a flat contact spring mounted on said frame in a direction substantially at a right angle with said shaft, a contact screw mounted fixedly on said frame in position to be engaged by said spring contact under the normal action of the spring, a disk secured on said shaft with a lateral projection, a projection on the spring adapted to be engaged by the projection on the disk for actuating the spring, said disk projection and said spring projection being adapted to be lubricated by oil distributed by centrifugal force from said shaft, a bracket secured to said frame having a bar curved concentric with said disk near the periphery thereof, a contact screw mounted in said bar in position to be engaged by the spring contact when the spring is released, and a fender plate secured to said bracket and extending partially about the periphery of said disk and between the disk and said contact point, whereby the contact points will be protected from oil or the like being thrown centrifugally from said disk.

In witness whereof, we have hereunto affixed our signatures in the presence of the witnesses herein named.

LUTHER JAMES SEVISON.
LUTHER EARL SEVISON.

Witnesses:
CYRUS E. PATTEE,
NETTA H. BURT.

Copies of this patent may be obtained for five cents each, by addressing the "Commissioner of Patents, Washington, D. C."